United States Patent
Fukasawa et al.

(10) Patent No.: US 11,452,985 B2
(45) Date of Patent: Sep. 27, 2022

(54) METHOD FOR PRODUCING METAL-SUPPORTED ZEOLITE FOR ALCOHOLIC BEVERAGES, METAL-SUPPORTED ZEOLITE FOR ALCOHOLIC BEVERAGES, AND METHOD FOR PRODUCING ALCOHOLIC BEVERAGES

(71) Applicants: IDEMITSU KOSAN CO., LTD., Chiyoda-ku (JP); THE NIKKA WHISKY DISTILLING CO., LTD., Minato-ku (JP)

(72) Inventors: Shun Fukasawa, Chiba (JP); Yoshimi Kawashima, Ichihara (JP); Narinobu Kagami, Chiba (JP); Kenji Hosoi, Kashiwa (JP); Toshikazu Sugimoto, Moriya (JP)

(73) Assignees: IDEMITSU KOSAN CO., LTD., Chiyoda-ku (JP); THE NIKKA WHISKY DISTILLING CO., LTD., Minato-ku (JP)

( * ) Notice: Subject to any disclaimer, the term of this patent is extended or adjusted under 35 U.S.C. 154(b) by 776 days.

(21) Appl. No.: 15/550,456

(22) PCT Filed: Feb. 15, 2016

(86) PCT No.: PCT/JP2016/054321
§ 371 (c)(1),
(2) Date: Aug. 11, 2017

(87) PCT Pub. No.: WO2016/133055
PCT Pub. Date: Aug. 25, 2016

(65) Prior Publication Data
US 2018/0036711 A1 Feb. 8, 2018

(30) Foreign Application Priority Data

Feb. 16, 2015 (JP) .............................. JP2015-027861

(51) Int. Cl.
| | |
|---|---|
| *B01J 20/18* | (2006.01) |
| *C12H 1/04* | (2006.01) |
| *C12G 3/08* | (2006.01) |
| *B01J 20/30* | (2006.01) |
| *B01J 35/10* | (2006.01) |
| *B01J 37/30* | (2006.01) |

(Continued)

(52) U.S. Cl.
CPC ............ *B01J 20/186* (2013.01); *B01J 20/18* (2013.01); *B01J 20/2808* (2013.01); *B01J 20/30* (2013.01); *B01J 20/3085* (2013.01); *B01J 29/084* (2013.01); *B01J 29/126* (2013.01); *B01J 35/1057* (2013.01); *B01J 35/1085* (2013.01); *B01J 37/30* (2013.01); *C01B 39/026* (2013.01); *C01B 39/04* (2013.01); *C01B 39/20* (2013.01); *C01B 39/24* (2013.01); *C12G 3/08* (2013.01); *C12H 1/04* (2013.01); *B01J 2229/186* (2013.01)

(58) Field of Classification Search
CPC ...... B01J 20/18; B01J 20/3085; B01J 20/186; B01J 20/2808; B01J 29/094; B01J 29/126; B01J 35/1085; B01J 35/1057; B01J 37/30; B01J 2229/186; B01J 29/084; C01B 39/24; C01B 39/20; C01B 39/026
USPC ................ 502/60, 73, 79, 86, 400, 407, 414
See application file for complete search history.

(56) References Cited

U.S. PATENT DOCUMENTS

| 3,130,006 A | 4/1964 | Rabo et al. |
| 5,206,196 A | 4/1993 | Nakano et al. |

(Continued)

FOREIGN PATENT DOCUMENTS

| CN | 86107014 A | 5/1988 |
| JP | 48-22393 A | 3/1973 |

(Continued)

OTHER PUBLICATIONS

Gora-Marek et al., "Ag-loaded zeolites Y and USY as catalysts for selective ammonia oxidation", Catal. Sci. Technol., 2016, 6, 1651.*

(Continued)

*Primary Examiner* — Elizabeth D Wood
(74) *Attorney, Agent, or Firm* — Oblon, McClelland, Maier & Neustadt, L.L.P.

(57) ABSTRACT

The invention is to provide a method for producing a metal-supported zeolite for alcoholic beverages capable of efficiently removing unwanted components contained in alcoholic beverages to thereby reduce silver release, and the metal-supported zeolite for alcoholic beverages, and to provide a method for producing alcoholic beverages using the metal-supported zeolite for alcoholic beverages. For solution to problem, the production method for the metal-supported zeolite for alcoholic beverages of the invention is a production method for a metal-supported zeolite for alcoholic beverages for removing unwanted components contained in alcoholic beverages, and includes a first ion-exchange treatment step of processing a zeolite carrying a metal ion with an ammonium ion-containing aqueous solution to thereby exchange the metal ion in the zeolite for an ammonium ion, the zeolite containing a Y-type zeolite as the main ingredient, and a second ion-exchange treatment step of processing the ammonium ion-supported zeolite obtained in the previous ion-exchange treatment step with a silver ion-containing acidic aqueous solution to thereby exchange the ammonium ion therein with a silver ion.

2 Claims, 1 Drawing Sheet

(51) Int. Cl.
  *B01J 29/08* (2006.01)
  *B01J 29/12* (2006.01)
  *B01J 20/28* (2006.01)
  *C01B 39/04* (2006.01)
  *C01B 39/20* (2006.01)
  *C01B 39/24* (2006.01)
  *C01B 39/02* (2006.01)

(56) References Cited

U.S. PATENT DOCUMENTS

| | | |
|---|---|---|
| 5,916,836 A | 6/1999 | Toufar et al. |
| 2007/0167530 A1 | 7/2007 | Gerlach et al. |
| 2017/0037347 A1 | 2/2017 | Hosoi et al. |

FOREIGN PATENT DOCUMENTS

| | | |
|---|---|---|
| JP | 55-144879 A | 11/1980 |
| JP | 63-116685 A | 5/1988 |
| JP | 63-137668 A | 6/1988 |
| JP | 64-5481 A | 1/1989 |
| JP | 2-84957 A | 3/1990 |
| JP | 3-187374 A | 8/1991 |
| JP | 4-37604 A | 2/1992 |
| JP | 4-219143 A | 8/1992 |
| JP | 6-239713 A | 8/1994 |
| JP | 10-218617 A | 8/1998 |
| JP | 2004-222567 A | 8/2004 |
| JP | 2006-36616 A | 2/2006 |
| JP | 2006-55771 A | 3/2006 |
| JP | 2007-515448 A | 6/2007 |
| JP | 2012-16321 A | 1/2012 |
| JP | 2015-83525 A | 4/2015 |
| WO | 2015/098733 A1 | 7/2015 |
| WO | WO 2015/098762 A1 | 7/2015 |

OTHER PUBLICATIONS

Combined Office Action and Search Report dated Jun. 20, 2019 in Taiwanese Patent Application No. 105104465 (with English Translation of Categories of cited documents).

European Office Action dated Jan. 3, 2020, in Patent Application No. 16 752 441.2, 8 pages.

Japanese Office Action dated Apr. 23, 2019 in Japanese Patent Application No. 2018-086969 (with unedited computer generated English translation), 6 pages.

International Search Report dated May 17, 2016 in PCT/JP2016/054321 filed Feb. 15, 2016.

Extended European Search Report dated Jul. 4, 2018 in European Patent Application No. 16752441.2, 10 pages.

Summons to attend oral proceedings pursuant to Rule 115(1) EPC issued Jul. 2, 2021 in corresponding European Patent Application No. 16752441.2, 9 pages.

Office Action in CA Application No. 2976420, dated Nov. 24, 2021.

Indian Office Action dated Mar. 23, 2020 in Indian Patent Application No. 201747028639, 5 pages.

\* cited by examiner

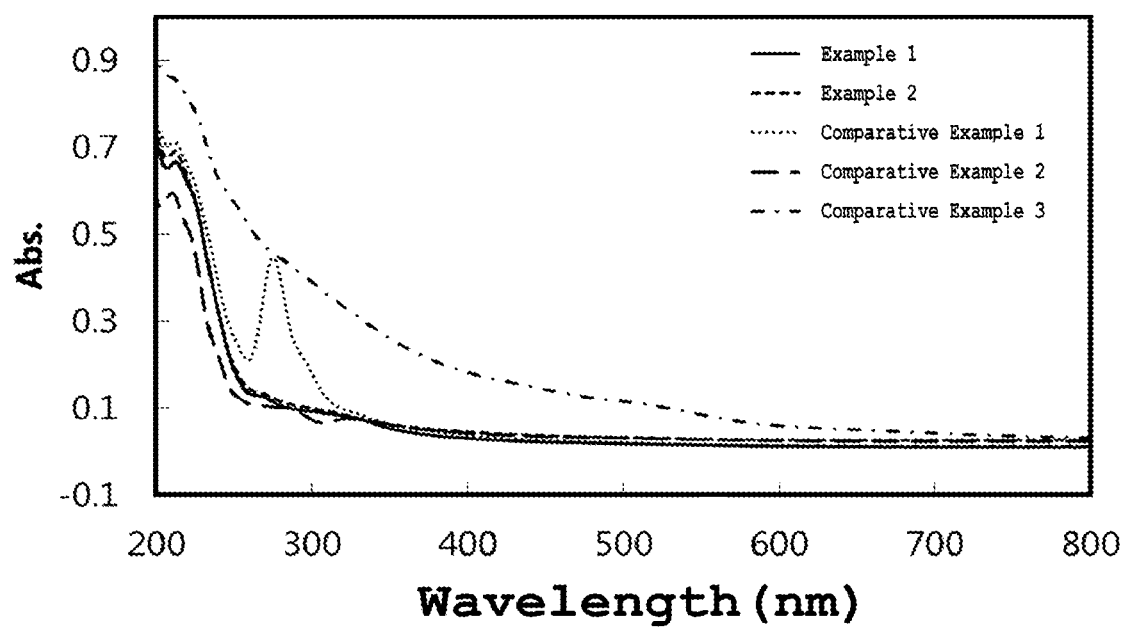

METHOD FOR PRODUCING METAL-SUPPORTED ZEOLITE FOR ALCOHOLIC BEVERAGES, METAL-SUPPORTED ZEOLITE FOR ALCOHOLIC BEVERAGES, AND METHOD FOR PRODUCING ALCOHOLIC BEVERAGES

TECHNICAL FIELD

The present invention relates to a method for producing a metal-supported zeolite for alcoholic beverages for removing unwanted components contained in alcoholic beverages, the metal-supported zeolite for alcoholic beverages, and a method for producing an alcoholic beverage using the metal-supported zeolite for alcoholic beverages.

BACKGROUND ART

Some alcoholic beverages are, while stored in barrels, matured for at least 4 to 6 years, generally for 7 to 10 years, but for a longer period of time of about 20 years, like whisky.

During storage, there may occur evaporation and annihilation of unmatured components such as sulfur compounds, etc.; reaction (oxidation, acetalization, esterification, etc.) of new make spirits (fresh whisky)-derived components, decomposition reaction of barrel materials-derived components, reaction of raw material-derived components released in barrels and raw whisky, state change of ethanol and water constituting raw whisky, etc., whereby matured whisky can come to have taste intrinsic thereto.

However, during storage, raw whisky may be absorbed by barrels or may evaporate through barrels, and therefore the amount of the stored raw whisky naturally decreases. Consequently, prolongation of the storage period causes increase in product loss, from the viewpoint of production efficiency.

Given the situation, a method of proactively removing unwanted components for alcoholic beverages, for example, unmatured components such as sulfur compounds and the like, precipitated components to form in a cold season, unpleasant odor components and others, from alcoholic beverages instead of waiting for spontaneous change thereof to occur during storage, is taken into consideration.

As a method of removing unwanted components from alcoholic beverages, for example, there have already been proposed a method of bringing alcoholic beverages into contact with an adsorbent prepared by processing silica with an organic silane compound (see PTL 1), a method of bringing alcoholic beverages into contact with activated carbon (see PTL 2), a method of using an ion-exchange resin (see PTL 3), a method of using metal particles and a resin layer (see PTL 4), etc.

For alcoholic beverages, it is said that using a metal-supported, especially silver or copper oxide-supported adsorbent is preferred from the viewpoint of selectively removing unmatured components such as sulfur compounds, etc. However, such adsorbents often remove even flavor components.

In addition, depending on the method for producing adsorbents, metal components may aggregate, and for example, silver may be released in alcoholic beverages on a level unsuitable for edible use.

In this manner, there is room for further improvement in the above-mentioned prior-art technologies for providing products capable of satisfying quality on a higher level.

CITATION LIST

Patent Literature

PTL 1: JP 63-137668 A
PTL 2: JP 03-187374 A
PTL 3: JP 2004-222567 A
PTL 4: JP 2012-016321 A

SUMMARY OF INVENTION

Technical Problem

The present invention is to provide a method for producing a metal-supported zeolite for alcoholic beverages capable of efficiently removing unwanted components contained in alcoholic beverages to thereby reduce silver release and the metal-supported zeolite for alcoholic beverages, and to provide a method for producing alcoholic beverages using the metal-supported zeolite for alcoholic beverages.

Solution to Problem

The present inventors have found that, when an alcoholic beverage is made to pass through a specific metal-supported zeolite, unwanted components contained in the alcoholic beverage can be removed, and accordingly the above-mentioned problems can be solved.

Specifically, the gist of the present invention includes the following:

[1] A method for producing a metal-supported zeolite for alcoholic beverages for removing unwanted components contained in alcoholic beverages, including a first ion-exchange treatment step of processing a zeolite carrying a metal ion with an ammonium ion-containing aqueous solution to thereby exchange the metal ion in the zeolite for an ammonium ion, the zeolite containing a Y-type zeolite as the main ingredient, and a second ion-exchange treatment step of processing the ammonium ion-supported zeolite obtained in the previous ion-exchange treatment step with a silver ion-containing acidic aqueous solution to thereby exchange the ammonium ion therein with a silver ion.

[2] The method for producing a metal-supported zeolite for alcoholic beverages according to [1], wherein the ammonium ion-containing aqueous solution is selected from an aqueous ammonium nitrate solution, an aqueous ammonium chloride solution, an aqueous ammonium sulfate solution, an aqueous ammonium phosphate solution, an aqueous ammonium acetate solution and an aqueous ammonia solution.

[3] The method for producing a metal-supported zeolite for alcoholic beverages according to [1] or [2], wherein the silver ion-containing acidic aqueous solution is an aqueous silver nitrate solution.

[4] A metal-supported zeolite for alcoholic beverages for removing unwanted components contained in alcoholic beverages, which carries a silver ion as the metal ingredient, which contains a Y-type zeolite as the main ingredient, and wherein:

in ultraviolet-visible absorption spectroscopy of the metal-supported zeolite for alcoholic beverages, the height of the absorption peak UV1 observed between 250 and 270 nm and the height of the absorption peak UV2 observed between 210 nm±10 nm satisfy (UV1/UV2)≤0.2, the amount of the supported silver ion in terms of an oxide thereof is 10% or more and 20% or less, the silver-supported amount is 0.15 g or more relative to 1 g of zeolite, and the use ratio in terms of silver is 85% or more, the use ratio in terms of silver being obtained according to the following expression:

> Use ratio in terms of silver (%)={silver-supported amount in terms of an oxide thereof/silver charged amount in terms of an oxide thereof (theoretical value)}×100.

[5] The metal-supported zeolite for alcoholic beverages according to [4], wherein the Y-type zeolite is contained in an amount of 80% by mass or more based on the total mass of the metal-supported zeolite for alcoholic beverages.

[6] A method for producing an alcoholic beverage, including a purifying step of purifying the alcoholic beverage, wherein in the purifying step, unwanted components contained in the alcoholic beverage are removed by the metal-supported zeolite for alcoholic beverages of claim 4 or 5.

[7] The method for producing an alcoholic beverage according to [6], wherein the alcoholic beverage is a distilled alcoholic beverage.

[8] The method for producing an alcoholic beverage according to [6], wherein the alcoholic beverage is a brewed alcoholic beverage.

Advantageous Effects of Invention

According to the present invention, there can be provided a method for producing a metal-supported zeolite for alcoholic beverages capable of efficiently removing unwanted components contained in alcoholic beverages and capable of reducing silver release, the metal-supported zeolite for alcoholic beverages, and a method for producing alcoholic beverages using the metal-supported zeolite for alcoholic beverages.

BRIEF DESCRIPTION OF DRAWING

FIG. 1 is a graphic showing the results of ultraviolet-visible absorption spectroscopy of the shaped bodies obtained in Examples and the shaped bodies obtained in Comparative Examples.

DESCRIPTION OF EMBODIMENTS

[Method for Producing Metal-Supported Zeolite for Alcoholic Beverages]

The method for producing a metal-supported zeolite for alcoholic beverages of the present invention is a method for producing a metal-supported zeolite for alcoholic beverages for removing unwanted components contained in alcoholic beverages, and includes a first ion-exchange treatment step of processing a zeolite carrying a metal ion with an ammonium ion-containing aqueous solution to thereby exchange the metal ion in the zeolite for an ammonium ion, the zeolite containing a Y-type zeolite as the main ingredient, and a second ion-exchange treatment step of processing the ammonium ion-supported zeolite obtained in the previous ion-exchange treatment step with a silver ion-containing acidic aqueous solution to thereby exchange the ammonium ion therein with a silver ion.

According to the method for producing a metal-supported zeolite for alcoholic beverages in this embodiment, a metal ion is supported inside the crystal of zeolite through ion exchange. In the metal-supported zeolite for alcoholic beverage according to this embodiment, the metal ion that is finally supported by zeolite is a silver (hereinafter this may be expressed as Ag) ion.

In the first ion-exchange treatment step, for example, where ammonium nitrate is used as the ammonium ion, the concentration of the aqueous ammonium nitrate solution is 1% by mass or more and 50% by mass or less, preferably 3% by mass or more and 20% by mass or less, more preferably 5% by mass or more and 10% by mass or less.

The temperature condition is 0° C. or higher and 100° C. or lower, preferably 20° C. or higher and 80° C. or lower, more preferably 40° C. or higher and 60° C. or lower. The processing time is 1 hour or more and 10 hours or less, preferably 2 hours or more and 8 hours or less, more preferably 3 hours or more and 5 hours or less.

In the first ion-exchange treatment step, the metal ion in zeolite is exchanged for an ammonium ion, and accordingly, in the second ion-exchange treatment step, the dispersibility in zeolite of the silver ion to be ion-exchanged can be enhanced.

In the second ion-exchange treatment step, for example, where silver nitrate is used as the silver ion-containing acidic aqueous solution, the concentration of the aqueous silver nitrate solution to be used is 1% by mass or more and 50% by mass or less, preferably 3% by mass or more and 25% by mass or less, more preferably 5% by mass or more and 15% by mass or less.

When the silver ion-containing aqueous solution becomes basic, in general, it forms a precipitate. For dissolving silver in a basic aqueous solution, for example, a complex ion with an ammonium ion must be formed. However, when an ion such as an ammonium ion exists, there occurs competing ion exchange in an ion-exchange treatment step and the silver ion-supported amount lowers. Consequently, the silver ion-containing aqueous solution for use for ion exchange is preferably an acidic aqueous solution.

The temperature condition is 0° C. or higher and 100° C. or lower, preferably 20° C. or higher and 80° C. or lower, more preferably 40° C. or higher and 60° C. or lower.

The time is 1 hour or more and 10 hours or less, preferably 2 hours or more and 8 hours or less, more preferably 3 hours or more and 5 hours or less.

The operation of the first ion-exchange treatment step and the second ion-exchange treatment step may be repeated plural times. In the first ion-exchange treatment step, any other metal ion than an ammonium ion may be contained, and in the second ion-exchange treatment step, any other metal ion than a silver ion may be contained.

After the second ion-exchange treatment step, the silver ion-supported zeolite may be washed with water or the like and may be dried at a temperature of 50° C. or higher, preferably 50° C. or higher and 200° C. or lower or so. After dried, the zeolite may be further calcined at a temperature of 500° C. or lower, preferably 200° C. or higher and 500° C. or lower or so, for a few hours.

[Metal-Supported Zeolite for Alcoholic Beverages]

The metal-supported zeolite for alcoholic beverages that is obtained according to the production method of this embodiment is for removing unwanted components contained in alcoholic beverages. The unwanted components to be removed are components that detract from the taste of alcoholic beverages, mainly including unappetizing components. The unappetizing components include sulfur compounds such as dimethyl sulfide, dimethyl disulfide, dimethyl trisulfide, etc.

The metal-supported zeolite for alcoholic beverages according to this embodiment removes the above-mentioned unwanted components contained in alcoholic beverages, but can leave flavor components such as higher alcohols, fusels, esters and the like in alcoholic beverages.

The targeted alcoholic beverages are not specifically limited, and the present invention is applicable to all kinds of alcoholic beverages. Concretely, the present invention is applicable to all kinds of distilled alcoholic beverages such as whisky, brandy, gin, vodka, tequila, rum, white sake, arrack, etc. The present invention is also applicable to all kinds of brewed alcoholic beverages and mixed liquors such as refined sake, beer, wine, fortified wine, Chinese alcoholic beverages, etc. Among brewed alcoholic beverages and mixed liquors, refined sake is favorably used. Further, the present invention is applicable to all kinds of shochu including barley shochu, rice shochu, sweet potato shochu, kokutoshu (distilled liquor made from brown sugar), buckwheat shochu, corn shochu, kasutori shochu (shochu made from sake lees), awamori (a kind of shochu made in Okinawa), etc.

The metal ion supported by the metal-supported zeolite for alcoholic beverages to be obtained according to the production method of this embodiment is silver. In addition to silver, ions of at least one metal element selected from copper, zinc, nickel, iron, cerium, lanthanum, zirconium and titanium may be contained in the metal-supported zeolite for alcoholic beverages.

The metal-supported zeolite for alcoholic beverages to be obtained according to the production method of this embodiment is obtained through exchange of a sodium ion for a silver ion on a sodium Y-type zeolite as a carrier, based on the above-mentioned production method.

When the metal ion is a mononuclear ion, the sodium ion in zeolite is readily exchanged for the mononuclear ion. Accordingly, the metal ion is readily supported in zeolite, and the sodium ion amount remaining in zeolite is small. In this manner, zeolite where the sodium ion amount remaining therein is small has a high activity for adsorption of sulfur compounds.

On the other hand, when the metal ion is a cluster ion, it is hardly exchanged for the sodium ion in zeolite. Consequently, the metal ion is hardly supported in the zeolite carrier and the amount of the sodium ion remaining in zeolite is large. Namely, zeolite where the sodium ion amount remaining therein is large has a low activity for adsorption of sulfur compounds.

When the sodium ion in zeolite is exchanged for an ammonium ion, the metal ion to be ion-exchanged in the next stage is in a mononuclear state and is readily ion-exchanged. Here, when the ammonium ion in the zeolite that has been ion-exchange for an ammonium ion is exchanged for a metal ion, the resultant zeolite can have a high activity for adsorption of sulfur compounds.

In addition, for example, zeolite in which the Si/Al ratio therein is high and the sodium ion amount is small in advance, such as an ultrastable Y zeolite (USY zeolite), can have a small sodium ion amount that can be exchanged for a metal ion even when the metal ion exists as a mononuclear ion, and therefore it is considered that the zeolite of the type has a low activity for adsorption of sulfur compounds.

From the above-mentioned viewpoint of the activity for adsorption of sulfur compounds, in zeolite in which the $Na_2O$-equivalent amount of the sodium ion remaining therein, not exchanged for a metal ion, is less than 0.5% by mass, the sodium ion amount capable of being exchanged for a metal ion is naturally too small, and therefore the zeolite of the type has little room for exchange for a metal ion, and could not have a sufficient activity for adsorption of sulfur compounds.

On the other hand, in zeolite in which the $Na_2O$-equivalent amount of the sodium ion is more than 7.0% by mass, many sodium ions not exchanged for a metal ion remain therein, and therefore the zeolite of the type could not have a sufficiently increased activity for adsorption of sulfur compounds.

From the above-mentioned viewpoint, the $Na_2O$ content is preferably 0.6% by mass or more and 6.5% by mass or less, more preferably 0.7% by mass or more and 6.0% by mass or less.

The amount of the silver ion supported by the metal-supported zeolite for alcoholic beverages according to this embodiment is preferably 10% or more and 20% or less. When the amount is less than 10%, the required desulfurization activity could not be realized. When the amount is more than 20%, the amount of the silver ion to be released increases unfavorably.

In the metal-supported zeolite for alcoholic beverage of this embodiment, preferably, the amount of silver supported therein in terms of an oxide thereof is 0.15 g or more relative to 1 g of the carrier zeolite and the use ratio in terms of silver is 85% or more.

Here, the use ratio in terms of silver is obtained according to the following expression:

Use ratio in terms of silver (%)={silver-supported amount in terms of an oxide thereof/silver charged amount in terms of an oxide thereof (theoretical value)}×100

When the use ratio in terms of silver is 85% or more, a larger amount of silver can be supported on zeolite, and consequently the loss ratio relative to the introduced silver can be reduced therefore resulting in production cost reduction and realizing an increased desulfurization performance.

The metal-supported zeolite for alcoholic beverages according to this embodiment gives an absorption peak at least between 180 nm and 250 nm in ultraviolet-visible absorption spectroscopy (UV-VIS).

In ultraviolet-visible absorption spectroscopy, the absorption peak observed between 180 nm and 250 nm belongs to a mononuclear ion of silver (as the case may be, copper, zinc, nickel, iron, cerium, lanthanum, zirconium and titanium).

In observation of the metal-supported zeolite for alcoholic beverages of this embodiment through ultraviolet-visible absorption spectroscopy, an absorption peak is observed between 180 nm and 250 nm, and this means that the zeolite contains a mononuclear ion of silver (as the case may be, copper, zinc, nickel, iron, cerium, lanthanum, zirconium and titanium), and when the intensity of the absorption peak is large, the amount of the mononuclear metal ion in the zeolite is large and the amount of the metal supported therein is large. Namely, this means that the zeolite of the type has a high ability to absorb sulfur compounds.

In the case where the metal component is silver, the metal-supported zeolite for alcoholic beverages of this embodiment gives at least an absorption peak between 210 nm±10 nm in ultraviolet-visible absorption spectroscopy.

In ultraviolet-visible absorption spectroscopy, preferably, the metal-supported zeolite for alcoholic beverages of this embodiment gives an absorption peak between 210 nm±10 nm and between 250 and 270 nm and the heights of the two peaks, UV1 (height of the absorption peak between 250 and 270 nm) and UV2 (height of the absorption peak between 210 nm±10 nm) satisfy (UV1/UV2)≤1.0.

In ultraviolet-visible absorption spectroscopy, the absorption peak observed between 210 nm±10 nm belongs to a mononuclear silver ion. The absorption peak observed between 250 and 270 nm belongs to a silver cluster ion.

From this, the absorption peak observed between 210 nm±10 nm in ultraviolet-visible absorption spectroscopy of the metal-supported zeolite for alcoholic beverage of this embodiment means that the zeolite contains a mononuclear silver ion, and the large intensity of the absorption peak means that the zeolite contains a large amount of a mononuclear metal ion.

In ultraviolet-visible absorption spectroscopy of the metal-supported zeolite for alcoholic beverage of this embodiment, the absorption peak heights (intensities) between 210 nm±10 nm and between 250 and 270 nm, UV2 (height of the absorption peak between 210 nm±10 nm) and UV1 (height of the absorption peak between 250 and 270 nm) satisfy (UV1/UV2)≤1.0, and this means that, in the zeolite of the type, the amount of the mononuclear silver ion is larger than that of the silver cluster ion, and that the absorption performance of the zeolite for sulfur compounds at low temperature (room temperature) is enhanced.

From the above-mentioned viewpoint, more preferably, (UV1/UV2)≤0.4, even more preferably (UV1/UV2)≤0.2.

[Zeolite]

The carrier that constitutes the metal-supported zeolite for alcoholic beverages of this embodiment is mainly a zeolite having 12-membered or 10-membered micropores. In a zeolite having micropores smaller than these (8-membered micropores, etc.), unappetizing components of organic compounds could not diffuse in the micropores, and therefore the zeolite of the type is unsuitable as it could not exhibit a removal performance. On the other hand, a zeolite having micropores larger than the above (14-membered micropores, etc.) requires a production method that needs a specific structure-regulatory agent, and is therefore unsuitable since the zeolite itself is extremely expensive.

Among the zeolite having 12-membered or 10-membered micropores, a zeolite having an FAU or BEA structure is preferred, and a zeolite having an FAU structure is especially preferred. The zeolite having an FAU structure is grouped into an X-type zeolite and a Y-type zeolite depending on the elementary ratio of Si and Al therein.

Among these, one that contains a Y-type zeolite in an amount of 80% by mass or more based on the total mass of the metal-supported zeolite for alcoholic beverages is preferred.

The compositional formula of the zeolite having an FAU structure is $Na_nAl_nSi_{192-n}O_{384} \cdot xH_2O$. Among these, the structure where n is 48 to 76 is a Y-type zeolite, and the structure where n is 77 to 96 is an X-type zeolite.

The BET specific surface area of the zeolite as a carrier to constitute the metal-supported zeolite for alcoholic beverages of this embodiment is preferably 500 m$^2$/g or more and 900 m$^2$/g or less, more preferably 550 m$^2$/g or more and 850 m$^2$/g or less.

The micropore volume of the zeolite is preferably 0.05 cc/g or more and 0.40 cc/g or less, more preferably 0.10 cc/g or more and 0.35 cc/g or less.

The mean particle size of the zeolite is preferably 0.1 mm or more and 5 mm or less, more preferably 0.3 mm or more and 3 mm or less, even more preferably 0.5 mm or more and 2 mm or less.

The metal-supported zeolite for alcoholic beverage of this embodiment may be shaped along with a binder component added thereto. Regarding the amount of the binder component to be added, it is desirable that the binder component is added in an amount of preferably 5% by mass or more and 50% by mass or less, more preferably 10% by mass or more and 30% by mass or less, based on the total amount of the metal-supported zeolite for alcoholic beverages, and then the resultant is shaped.

As the usable binder component, alumina, silica or the like is preferred. From the viewpoint of facilitating shaping, a clay mineral such as bentonite, vermiculite or the like, or an organic additive such as cellulose or the like may be further added. The above-mentioned binder component may be added to zeolite and then shaped into a metal-supported zeolite for alcoholic beverage, according to an ordinary method such as extrusion molding, tabletting, rotary granulation, spray drying or the like.

[Method for Producing Alcoholic Beverages]

The production method for alcoholic beverages according to the embodiment of the present invention includes a purification step for purifying alcoholic beverages, and in the purification step, unwanted components contained in alcoholic beverages are removed by the use of the above-mentioned metal-supported zeolite for alcoholic beverages.

The purification condition where the metal-supported zeolite for alcoholic beverages is used is as follows.

When the concentration of sulfur compounds in raw whisky is 100 ppm by volume or less, desulfurization with the above-mentioned metal-supported zeolite for alcoholic beverages is applicable thereto. The concentration of sulfur compounds is preferably 10 ppm by volume or less.

The temperature range is −50° C. or higher and 150° C. or lower, preferably −50° C. or higher and 120° C. or lower, more preferably −20° C. or higher and 100° C. or lower.

In the case of a system where raw whisky is made to pass through the above-mentioned metal-supported zeolite for alcoholic beverages, the range of the liquid-hourly space velocity (LHSV) is 0.1 h$^{-1}$ or more and 100 h$^{-1}$ or less, more preferably 0.5 or more and 50 h$^{-1}$ or less, even more preferably 1 or more and 30 h$^{-1}$ or less.

Under the above-mentioned purification condition, unwanted components can be removed while flavor components such as high alcohols, fusels, esters and others can be left in alcoholic beverages.

EXAMPLES

Hereinunder the present invention is described in more detail with reference to Examples. The present invention is not limited to the following Examples.

[Evaluation Method]

The components of the alcoholic beverage under test to be mentioned below were analyzed according to the following method.

<Quantitative Determination of Silver Amount Supported on Metal-Supported Zeolite for Alcoholic Beverages>

The amount of silver supported on a metal-supported zeolite for alcoholic beverages was quantitatively determined using an ICP emission spectrometer, 720-ES manufactured by Agilent Technologies, Inc. The amount of supported silver is an amount of supported silver in terms of a silver oxide thereof (the same shall apply hereinunder). For pretreatment for forming a metal-supported zeolite for alcoholic beverages into an aqueous solution thereof, an alkali fusion method was employed.

<Use Ratio Regarding Silver>

The use ratio regarding silver in terms of an oxide thereof was calculated according to the following expression, using the value of the amount of silver supported on a metal-supported zeolite for alcoholic beverages quantified as above.

> Use ratio in terms of an oxide thereof (%)={silver-supported amount in terms of an oxide thereof in zeolite/charged amount in terms of an oxide thereof (theoretical value)}×100

<Componential Analysis of Alcoholic Beverages>

Sulfur compounds (dimethyl sulfide (DMS) and dimethyl disulfide (DMDS)) in an alcoholic beverage under test were analyzed using a GC-SCD apparatus (chemiluminescent sulfur detector-attached gas chromatography), GC:6890N/SCD:355 manufactured by Agilent Technologies, Inc.

The test method for desulfurization ratio was determined using a flow reactor. 2.5 L of an alcoholic beverage was used for the test. 18 cm$^3$ of a desulfurizing agent was put in a column having a diameter of 1 cm and sealed up, and the test sample was led to pass through the column. Subsequently, the components in the test sample were again analyzed. The flow condition was LHSV=20 h$^{-1}$, and the processed liquid after 7 hours was collected and analyzed.

The desulfurization ratio (%) was calculated according to the following expression.

> Desulfurization Ratio=[(sulfur compound concentration before test−sulfur compound concentration after desulfurization)/sulfur compound concentration before test]×100

<Ultraviolet-Visible Absorption Spectroscopy>

According to a diffuse reflection method using V-650 manufactured by JASCO Corporation, the sample was analyzed in a measurement range of 800 to 200 nm.

<Silver Solubility>

Silver solubility was determined as follows. First, an aqueous solution after desulfurization was subjected to pretreatment of sulfuric acid treatment and ashing treatment in that order, and then formed into a homogeneous aqueous solution according to an alkali fusion method. Silver contained in the aqueous solution was quantified using an ICP emission spectrometer (720-ES, manufactured by Agilent Technologies, Inc.).

PRODUCTION EXAMPLES FOR DESULFURIZING AGENT

Desulfurizing agents were produced in the following Production Examples 1 to 5.

Production Example 1

A mean particle size of a commercial product, sodium Y-type zeolite shaped body (manufactured by Tosoh Corporation, HSZ-320NAD1A) was regulated by grounding it so that it has a mean particle size of 1.0 to 1.5 mm. 264 g of ammonium nitrate was dissolved in 3.3 L of water, 1 kg of the zeolite was put thereinto, and the liquid was stirred for 3 hours for ion-exchange treatment to give an NH$_4$Y-type zeolite. After washing with water, 1 kg of the NH$_4$Y-type zeolite was put into an aqueous silver nitrate solution prepared by dissolving 394 g of silver nitrate in 3 L of water, and the liquid was stirred for 3 hours for silver ion-exchange, and further washed with water and dried. Subsequently, this was calcined at 400° C. for 3 hours to produce an AgY-type zeolite 1.

Production Example 2

A mean particle size of a commercial product, sodium Y-type zeolite shaped body (manufactured by Tosoh Corporation, HSZ-320NAD1A) was regulated by grounding it so that it has a mean particle size of 1.0 to 1.5 mm. One kg of the sodium Y-type zeolite was put into an aqueous silver nitrate solution prepared by dissolving 394 g of silver nitrate in 3 L of water, and the liquid was stirred for 3 hours for silver ion-exchange, and further washed with water and dried. Subsequently, this was calcined at 400° C. for 3 hours to produce an AgY-type zeolite 2.

Production Example 3

A mean particle size of a commercial product, sodium Y-type zeolite shaped body (manufactured by Tosoh Corporation, HSZ-320NAD1A) was regulated by grounding it so that it has a mean particle size of 1.0 to 1.5 mm. 264 g of ammonium nitrate was dissolved in 3.3 L of water, 1 kg of the zeolite was put thereinto, and the liquid was stirred for 3 hours for ion-exchange treatment to give an NH$_4$Y-type zeolite. After washing with water, 1 kg of the NH$_4$Y-type zeolite was put into an aqueous silver nitrate solution prepared by dissolving 315.2 g of silver nitrate in 3 L of water, and the liquid was stirred for 3 hours for silver ion-exchange, and further washed with water and dried. Subsequently, this was calcined at 400° C. for 3 hours to produce an AgY-type zeolite 3.

Production Example 4

A mean particle size of a commercial product, sodium Y-type zeolite shaped body (manufactured by Tosoh Corporation, HSZ-320NAD1A) was regulated by grounding it so that it has a mean particle size of 1.0 to 1.5 mm. 264 g of ammonium nitrate was dissolved in 3.3 L of water, 1 kg of the zeolite was put thereinto, and the liquid was stirred for 3 hours for ion-exchange treatment to give an NH$_4$Y-type zeolite. After washing with water, 1 kg of the NH$_4$Y-type zeolite was put into an aqueous silver nitrate solution prepared by dissolving 157.6 g of silver nitrate in 3 L of water, and the liquid was stirred for 3 hours for silver ion-exchange, and further washed with water and dried. Subsequently, this was calcined at 400° C. for 3 hours to produce an AgY-type zeolite 4.

Production Example 5

A mean particle size of a commercial product, NaX-type zeolite shaped body (manufactured by Tosoh Corporation, Zeolum F-9) was regulated by grounding it so that it has a mean particle size of 1.0 to 1.5 mm. 528 g of ammonium nitrate was dissolved in 3.3 L of water, 1 kg of the zeolite was put thereinto, and the liquid was stirred for 3 hours for ion-exchange treatment to give an NH$_4$X-type zeolite. After washing with water, 1 kg of the NH$_4$X-type zeolite was put into an aqueous silver nitrate solution prepared by dissolving 315.2 g of silver nitrate in 3 L of water, and the liquid was stirred for 3 hours for silver ion-exchange, and further washed with water and dried. Subsequently, this was calcined at 400° C. for 3 hours to produce an AgX-type zeolite 1.

EXAMPLES AND COMPARATIVE EXAMPLES

Example 1

Whisky (malt whisky (alcohol content 62%)) was made to pass through the AgY-type zeolite 1 obtained in Production Example 1, and based on the above-mentioned evaluation test, the components before and after the liquid passing were compared. Whisky before the treatment contained 1.7816 ppm of DMS and 0.4226 ppm of DMDS. The results are shown in Table 1.

Example 2

Whisky (malt whisky (alcohol content 62%)) was made to pass through the AgY-type zeolite 3 obtained in Production Example 3, and based on the evaluation test, the components before and after the liquid passing were compared. Whisky before the treatment contained 1.7816 ppm of DMS and 0.4226 ppm of DMDS. The results are shown in Table 1.

Comparative Example 1

Whisky (malt whisky (alcohol content 62%)) was made to pass through the AgY-type zeolite 2 obtained in Production Example 2, and based on the above-mentioned evaluation test, the components before and after the liquid passing were compared. The results are shown in Table 1.

Comparative Example 2

Whisky (malt whisky (alcohol content 62%)) was made to pass through the AgY-type zeolite 4 obtained in Production Example 4, and based on the above-mentioned evaluation test, the components before and after the liquid passing were compared. The results are shown in Table 1.

Comparative Example 3

Whisky (malt whisky (alcohol content 62%)) was made to pass through the AgX-type zeolite 1 obtained in Production Example 5, and based on the above-mentioned evaluation test, the components before and after the liquid passing were compared. The results are shown in Table 1.

The AgY-type zeolite used in Example 1 and the AgY-type zeolite used in Comparative Example 1 were analyzed through ultraviolet-visible absorption spectroscopy as mentioned above. The results are shown in FIG. 1.

As shown in FIG. 1, the silver ion-exchanged Y-type zeolite obtained in Example 1 and Example 2 gave a peak at around 210 nm, but did not almost give a peak at around 270 nm that was observed in Comparative Example 1. The peak intensity ratio of the absorption peak at around 270 nm to the absorption peak at around 210 nm was 0.18 to 0.19.

The silver ion-exchanged Y-type zeolite obtained in Comparative Example 1 gave a large absorption peak at around 210 nm and at around 270 nm in ultraviolet-visible absorption spectroscopy. The peak intensity ratio of the absorption peak at around 270 nm to the absorption peak at around 210 nm was 0.63.

The X-type zeolite in Comparative Example 3 showed a behavior to increase the absorption at around 280 nm. This is considered to be derived from the X-type zeolite and the binder constituting the carrier to support the silver ion. In the case of using the X-type zeolite, the peak intensity ratio of the absorption peak at around 270 nm to the absorption peak at around 210 nm was more than 0.2. As a result, the DMS desulfurization ratio and the DMDS desulfurization ratio were lower than those in Examples 1 and 2.

EVALUATION RESULTS

It is known that the AgY-type zeolites of Examples wherein, in ultraviolet-visible absorption spectroscopy, the height of the absorption peak UV1 observed between 250 and 270 nm and the height of the absorption peak UV2 observed between 210 nm±10 nm satisfy (UV1/UV2)≤0.2, the amount of the supported silver ion in terms of an oxide thereof is 10% or more and 20% or less, the silver-supported amount is 0.15 g or more relative to 1 g of zeolite, and the use ratio in terms of silver is 85% or more, can satisfy both increased desulfurization performance and reduced silver release.

The invention claimed is:

1. A method for producing a metal-supported zeolite with silver ion supported as a metal ingredient, comprising:
performing a first ion-exchange treatment comprising processing a zeolite carrying a metal ion with an ammonium ion-containing aqueous solution to thereby exchange the metal ion in the zeolite for an ammonium ion, the zeolite comprising a Y-type zeolite in an amount of 80% by mass or more based on the total mass of the metal-supported zeolite, and
performing a second ion-exchange treatment comprising processing the ammonium ion-exchanged zeolite obtained in the first ion-exchange treatment with an aqueous silver nitrate solution, wherein said aqueous silver nitrate solution comprises silver in a concentration ranging from 5% by mass to 15% by mass, to thereby exchange the ammonium ion therein with a silver ion
wherein the metal-supported zeolite has a silver use ratio of 85% or more, the silver use ratio determined according to the following expression:

silver use ratio (%)=[silver supported amount in terms of an oxide thereof in zeolite/charged amount in terms of an oxide thereof (theoretical value)]×100;

and
wherein the metal-supported zeolite in ultraviolet-visible absorption spectroscopy is in a measurement range of

TABLE 1

| | Example | | Comparative Example | | |
|---|---|---|---|---|---|
| | 1 | 2 | 1 | 2 | 3 |
| Production Example | 1 | 3 | 2 | 4 | 5 |
| Silver Charged Percentage (%)* | 21.2 | 17.7 | 21.2 | 9.7 | 17.7 |
| Amount of Supported Silver in Terms of an Oxide thereof (%) | 19.0 | 17.2 | 19.3 | 9.1 | 17.7 |
| Use Ratio Regarding Silver to Charged Amount (%)** | 87.6 | 97.1 | 88.9 | 93.5 | 100 |
| Supported Amount of Silver relative to 1 g of Carrier (g)*** | 0.24 | 0.21 | 0.24 | 0.10 | 0.21 |
| Zeolite Used | Y-type | Y-type | Y-type | Y-type | X-type |
| UV-VIS 210 nm | 0.66 | 0.69 | 0.71 | 0.59 | 0.86 |
| Analysis 270 nm | 0.12 | 0.13 | 0.45 | 0.11 | 0.47 |
| Results 270 nm/210 nm | 0.19 | 0.18 | 0.63 | 0.18 | 0.55 |
| Amount of Silver Release in Processing Liquid (ppm) | 8.0 | 8.0 | 12.0 | 1.0 | <1.0 |
| DMS Desulfurization Ratio (%) | 91 | 100 | 98 | 87 | 57 |
| DMDS Desulfurization Ratio (%) | 78 | 71 | 70 | 21 | 24 |

*Silver Charged Amount (%) in Terms of an Oxide thereof
**Use Ratio Regarding Silver in Terms of an Oxide thereof to Charged Amount in terms of an Oxide thereof (%).
***Supported Amount of Silver in terms of an oxide thereof relative to 1 g of Carrier (g).

800 to 200 nm according to a diffuse reflection method of the metal-supported zeolite, the height of the absorption peak UV1 observed between 250 and 270 nm and the height of the absorption peak UV2 observed between 210 nm±10 nm satisfy (UV1/UV2)≤0.2.

2. The method according to claim 1, wherein the ammonium ion-containing aqueous solution is selected from the group consisting of an aqueous ammonium nitrate solution, an aqueous ammonium chloride solution, an aqueous ammonium sulfate solution, an aqueous ammonium phosphate solution, an aqueous ammonium acetate solution and an aqueous ammonia solution.

* * * * *